Aug. 3, 1926.

A. N. MERLE 1,594,895

CONTROL DEVICE FOR THE FILM GATES IN MOTION PICTURE APPARATUS

Filed March 23, 1923

André Noël Merle
INVENTOR;

By
his Attorney.

Patented Aug. 3, 1926.

1,594,895

UNITED STATES PATENT OFFICE.

ANDRÉ NOËL MERLE, OF PARIS, FRANCE, ASSIGNOR TO PATHE CINEMA, ANCIENS ETABLISSEMENTS PATHE FRERES, OF PARIS, FRANCE.

CONTROL DEVICE FOR THE FILM GATES IN MOTION-PICTURE APPARATUS.

Application filed March 23, 1923, Serial No. 627,007, and in France December 11, 1922.

This invention relates to a device for controlling the film gate in a motion picture apparatus.

According to this invention, the film gate is operatively connected to the door of the apparatus which permits bringing the film gate into the clamping or releasing position when the door of the apparatus is respectively closed or opened.

This is obtained for instance by providing the door of the apparatus with a stop piece which is adapted to press upon the film gate when the said door is closed, in order to engage said film gate in the corresponding guide for the film, said film gate being disengaged when the door of the apparatus is opened.

In the accompanying drawing which shows by way of example the above said embodiment of the invention:

Figure 1:
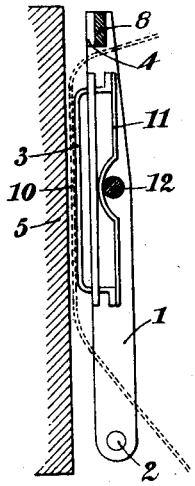
Fig. 1 is an elevational view of the film gate the door of the apparatus being removed.
Figure 2:
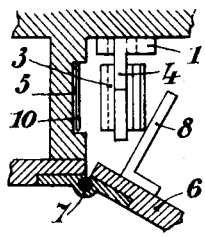
Fig. 2 is a sectional view of the device, the section plane being perpendicular to the axis of the door of the apparatus, the film gate and the door of the apparatus being in the opening position.
Figure 3:
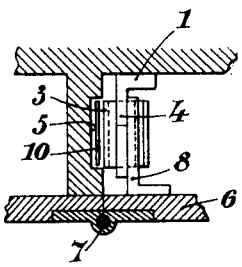
Fig. 3 is a view similar to Fig. 2, the film gate and the door of the apparatus being in the closing position.

The film gate 1 is pivoted at 2 to the body of the motion picture apparatus and carries the pressing frame 3 which presses the film in the guide 5 of the apparatus, by means of the spring 11 bearing upon the rod 12 rigidly secured to the film gate 1. The door 6 of the apparatus is pivoted to the body at 7 and is provided with the small angle bracket 8 whose flange perpendicular to the gate is long enough for meeting the member 4 secured to the film gate and thus exert a pressure on the latter when the door is brought into the closing position. The operation of the apparatus will be easily understood. When the door 6 is opened, the film gate 1 is disengaged from the guide 5, as shown in Fig. 2. On the contrary, when the door 6 is closed, the angle bracket 8 presses upon the film gate and brings it into contact with the apparatus, so that the film will be pressed into the guide 5. When it is opened, the film gate is automatically released from the guide by the reaction of the spring 11 of the pressing frame 3. It is obvious that this disengagement might as well be obtained by means of any other suitable connection between the film gate and the apparatus door.

The improvement according to the invention affords thus a great simplification in the operations of loading and unloading the apparatus; for putting the film in place, after having disposed the film box in the apparatus, and the loop of film in the gate, it is merely sufficient to close the door of the apparatus.

It is obvious that constructional modifications may be brought to the device above described, without departing from the principle of the invention.

Having now described my invention, what I claim as new and desire to secure by Letters Patent is:

1. In a kinematographic apparatus a passage for the film provided on a vertical wall of the box of the apparatus, a film gate adapted to be moved towards and away from said passage for holding the film in the passage or releasing it, a pressing frame carried on the film gate, a lateral door for the box of the apparatus provided in a wall adjacent and perpendicular to the wall provided with the passage for the film and means for connecting operatively said film gate to said lateral door so that the film gate is in operative position when the lateral door is closed and that the film is in inoperative position when the lateral door is open.

2. In a kinematographic apparatus a passage for the film provided on a vertical wall of the box of the apparatus, a film gate adapted to be moved towards and away from said passage for holding the film in the passage or releasing it, a pressing frame carried on the film gate, a lateral door for the box of the apparatus provided in a wall adjacent and perpendicular to the wall provided with the passage for the film and a stop piece secured to and extending from said door and adapted to meet said film gate thereby bringing the same into its operative position when the door is closed.

In testimony whereof I have signed my name to this specification.

ANDRÉ NOËL MERLE.